(12) United States Patent
O'Neal

(10) Patent No.: US 12,263,463 B2
(45) Date of Patent: Apr. 1, 2025

(54) BIOMASS PYROLYSIS SYSTEMS AND METHODS FOR METAL REMOVAL FROM BIOFUEL

(71) Applicant: ExxonMobil Technology and Engineering Company, Annandale, NJ (US)

(72) Inventor: Everett J. O'Neal, Asbury, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/190,478

(22) Filed: Mar. 3, 2021

(65) Prior Publication Data

US 2021/0370261 A1 Dec. 2, 2021

Related U.S. Application Data

(60) Provisional application No. 63/032,765, filed on Jun. 1, 2020.

(51) Int. Cl.
*B01J 20/20* (2006.01)
*B01D 53/04* (2006.01)
(Continued)

(52) U.S. Cl.
CPC .............. *B01J 20/20* (2013.01); *B01D 53/04* (2013.01); *B01J 6/008* (2013.01); *B01J 20/3078* (2013.01);
(Continued)

(58) Field of Classification Search
CPC ........ B01D 2253/102; B01D 2257/302; B01D 2257/304; B01D 2257/60; B01D 53/04;
(Continued)

(56) References Cited

U.S. PATENT DOCUMENTS 4,338,198 A 7/1982 Brown
5,824,221 A 10/1998 Thueer et al.
(Continued)

FOREIGN PATENT DOCUMENTS

EP 2468875 A1 6/2012
WO 2010/078930 A2 7/2010
(Continued)

OTHER PUBLICATIONS

Deveci et al., "Adsorption of hexavalent chromium from aqueous solutions by bio-chars obtained during biomass pyrolysis", Journal of Industrial and Engineering Chemistry vol. 19 (2013) pp. 190-196.
(Continued)

*Primary Examiner* — Latosha Hines
(74) *Attorney, Agent, or Firm* — Shook Hardy & Bacon LLC

(57) ABSTRACT

The present disclosure relates to methods and systems for treating a fluid produced from a biorefinery to remove contaminants, such as metals and sulfur therefrom. Biomass is pyrolysed and activated to form activated carbon used to remove such contaminants. The fluid produced from the biorefinery may be one or more of a biofuel, a biogas, and wastewater.

8 Claims, 1 Drawing Sheet

(51) Int. Cl.
| | |
|---|---|
| *B01J 6/00* | (2006.01) |
| *B01J 20/30* | (2006.01) |
| *C01B 32/318* | (2017.01) |
| *C02F 1/28* | (2023.01) |
| *C02F 101/10* | (2006.01) |
| *C02F 101/20* | (2006.01) |
| *C02F 103/28* | (2006.01) |
| *C10G 1/00* | (2006.01) |
| *C10L 1/02* | (2006.01) |

(52) U.S. Cl.
CPC ......... B01J 20/3085 (2013.01); C01B 32/318 (2017.08); C02F 1/283 (2013.01); C10G 1/002 (2013.01); C10L 1/02 (2013.01); *B01D 2253/102* (2013.01); *B01D 2257/302* (2013.01); *B01D 2257/304* (2013.01); *B01D 2257/60* (2013.01); *C02F 2101/101* (2013.01); *C02F 2101/20* (2013.01); *C02F 2103/28* (2013.01); *C10G 2300/1011* (2013.01); *C10G 2300/202* (2013.01); *C10G 2300/205* (2013.01); *C10L 2200/0469* (2013.01); *C10L 2290/02* (2013.01); *C10L 2290/542* (2013.01)

(58) Field of Classification Search
CPC .... B01J 20/20; B01J 20/3078; B01J 20/3085; B01J 6/008; C01B 32/318; C02F 1/283; C02F 2101/101; C02F 2101/20; C02F 2103/28; C02F 2103/36; C10G 1/002; C10G 2300/1011; C10G 2300/202; C10G 2300/205; C10G 25/003; C10L 1/02; C10L 2200/0469; C10L 2290/02; C10L 2290/542

See application file for complete search history.

(56) References Cited

U.S. PATENT DOCUMENTS

| | | | |
|---|---|---|---|
| 8,017,373 | B2 | 9/2011 | Hill et al. |
| 8,236,535 | B2 | 8/2012 | Medoff et al. |
| 8,519,171 | B2 | 8/2013 | Koudil et al. |
| 8,545,633 | B2 | 10/2013 | Nguyen |
| 8,641,910 | B2 | 2/2014 | Wietgrefe |
| 9,809,867 | B2 | 11/2017 | Parekh et al. |
| 2007/0259412 | A1 | 11/2007 | Belanger et al. |
| 2009/0064567 | A1 | 3/2009 | Lippmeier et al. |
| 2010/0093047 | A1 | 4/2010 | Newman et al. |
| 2010/0124770 | A1 | 5/2010 | Sabesan et al. |
| 2010/0146843 | A1 | 6/2010 | Dumenil |
| 2010/0146844 | A1 | 6/2010 | Dumenil |
| 2012/0077234 | A1 | 3/2012 | Hazlebeck |
| 2012/0159839 | A1 | 6/2012 | Koskinen et al. |
| 2012/0316330 | A1 | 12/2012 | Zhu et al. |
| 2014/0030769 | A1 | 1/2014 | Resch et al. |
| 2015/0144564 | A1* | 5/2015 | Moller ............... C02F 1/283 210/201 |
| 2015/0197424 | A1* | 7/2015 | Mennell ............ G06Q 10/04 422/620 |
| 2015/0299739 | A1 | 10/2015 | Harlick et al. |
| 2016/0032414 | A1 | 2/2016 | Parekh et al. |
| 2016/0122786 | A1 | 5/2016 | Lin et al. |
| 2016/0138048 | A1* | 5/2016 | Snyder ............... C12P 5/023 435/167 |
| 2016/0244788 | A1 | 8/2016 | Retsina et al. |
| 2017/0002387 | A1 | 1/2017 | Retsina et al. |
| 2017/0051320 | A1 | 2/2017 | Yamashita et al. |
| 2017/0175152 | A1 | 6/2017 | Mcneely et al. |
| 2017/0226535 | A1* | 8/2017 | Tudman ............ C01B 32/342 |
| 2018/0010154 | A1 | 1/2018 | Smits |
| 2018/0312411 | A1 | 11/2018 | Perot et al. |
| 2020/0181664 | A1* | 6/2020 | Behkish ............ C02F 11/12 |
| 2021/0017549 | A1 | 1/2021 | Behkish et al. |

FOREIGN PATENT DOCUMENTS

| | | |
|---|---|---|
| WO | 2011/073781 A2 | 6/2011 |
| WO | 2012/010750 A2 | 1/2012 |
| WO | 2014/089652 A1 | 6/2014 |
| WO | 2017/093526 A1 | 6/2017 |
| WO | 2018/027181 A1 | 2/2018 |

OTHER PUBLICATIONS

Olivares-Marin et al., "Preparation of activated carbon from cherry stones by physcial activation in air. Influence of the chemical carbonisation with H2SO4", Journal of Analytical and Applied Pyrolysis vol. 94 (2012) pp. 131-137.

Suhas et al., "Lignin—from natural adsorbent to activated carbon: A review", Bioresource Technology vol. 98 (2007) pp. 2301-2312.

Contescu et al., "Activated Carbons Derived from High-Temperature Pyrolysis of Lignocellulosic Biomass", Journal of Carbon Research vol. 4 No. 51 (2018) pp. 1-16.

Abu-Zahra, M. R.M, et al., "CO2 capture from power plants: Part I. A parametric study of the technical performance based on monoethanolamine", International Journal of Greenhouse Gas Control, vol. 1, pp. 37-46 (2007).

Davis, R., et al., "Process Design and Economics for the Conversion of Lignocellulosic Biomass to Hydrocarbons: Dilute-Acid and Enzymatic Deconstruction of Biomass to Sugars and Biological Conversion of Sugars to Hydrocarbons." United States: N. p. 2013.Web. doi:10.2172/1107470 (147 pages).

Davis, R., et al., "Process Design and Economics for the Conversion of Lignocellulosic Biomass to Hydrocarbons: Dilute-Acid and Enzymatic Deconstruction of Biomass to Sugars and Biological Conversion of Sugars to Hydrocarbons." United States: N. p. 2015.Web. doi:10.2172/1107470 (133 pages).

Han et al. Characterization of a Bifunctional Cellulase and Its Structural Gene. JBC (1995), 43(27), 26012-26019. (Year: 1995).

Humbird, D, et al. Process Design and Economics for Biochemical Conversion of Lignocellulosic Biomass to Ethanol: Dilute-Acid Pretreatment and Enzymatic Hydrolysis of Com Stover. United States: N. p. 2011.Web. :loi:10.2172/1013269 (147 pages).

International Search Report and Written Opinion received for PCT Patent Application No. PCT/US2019/065231, mailed on Apr. 15, 2020, 13 pages.

Karaosmanoglu et al. Investigation of the Refining Step of Biodiesel Production. Energy and Fuels (1996), 10, 890-895. (Year: 1996).

Non-Final Office Action received for U.S. Appl. No. 17/142,799, mailed on Jan. 4, 2024, 21 pages.

Rodriguez-Mirasol et al., "Activated Carbons from CO2 Partial Gasification of Eucalyptus Kraft Lignin", Energy & Fuels, vol. 7, 1993, pp. 133-138.

Si et al. Lignin extraction distinctively enhances biomass enzymatic saccharification in hemicelluloses-rich Miscanthus species under various alkali and acid pretreatments. Bioresource Technology (2015), 183, 248-524. (Year: 2015).

Steen et al. Microbial production of fatty-acid-derived fuels and chemicals from plant biomass. Nature (2010), 463, 559-562. (Year: 2010).

Zhong et al. A self-sustaining advanced lignocellulosic biofuel production by integration of anaerobic digestion and aerobic fungal fermentation. Bioresource Technology (2015), 179, 173-179. (Year: 2015).

Bandosz, T.J., "Desulfurization on activated carbons", Department of Chemistry, City College of New York, 2006, 29 pages.

Final Office Action received for U.S. Appl. No. 17/142,799, filed May 2, 2024, 16 pages.

Notice of Allowance received for U.S. Appl. No. 17/142,799, filed Aug. 19, 2024, 8 pages.

* cited by examiner

BIOMASS PYROLYSIS SYSTEMS AND METHODS FOR METAL REMOVAL FROM BIOFUEL

CROSS-REFERENCE TO RELATED APPLICATIONS

This application is related to and claims the benefit of priority from U.S. Provisional Application No. 63/032,765 filed Jun. 1, 2020, which is hereby incorporated by reference in its entirety.

FIELD OF THE INVENTION

The present disclosure relates to systems and methods pertaining to biomass pyrolysis and, more particularly, systems and methods pertaining to biomass pyrolysis for the removal of metals from biofuels.

BACKGROUND OF THE INVENTION

Global efforts are underway for the development of sustainable sources of energy, including biofuels, to reduce reliance on fossil fuels and reduce greenhouse gas emissions. For example, the United States aims to increase the production of renewable fuel, particularly for use in transportation, by increasing amounts each year relative to petroleum-based fuels. Accordingly, the development of renewable or sustainable energy is of particular interest.

The use of biomass for making sustainable energy has been a focus for achieving reduced greenhouse gas emissions. Currently, sustainable energy efforts have largely focused on so-called "first-generation" biofuels derived from food-related biomass and the fermentable sugars therein. For example, fermentable sugars have been derived from sugarcane or corn and biologically fermented mainly to bioethanol. On the other hand, vegetable oils, animal fats, and the like have been chemically transesterified to produce biodiesel. A primary source of food-related first-generation biomass currently used for producing sustainable energy is derived from corn (e.g., corn starch). However, food-related biomasses, such as corn, are major global food sources and, accordingly, the first-generation efforts for producing sustainable energy competes with food availability.

So-called "second-generation" biofuels are derived from non-food or non-human food biomass and can be used to meet the demand for sustainable energy without competing with food resources. These non-food biomass sources include, for example, residues from agriculture, forestry, and municipal solid waste, as well as algae. Much of these non-food biomasses comprise lignocellulosic material. Lignocellulose is a complex of lignin, hemicellulose, and cellulose present in plant cell walls. Lignocellulose is readily available (e.g., derivable from sources including, among others, agricultural waste, forest residue, energy crops, and the like), and does not compete with food resources to supply fermentable sugars that can be harnessed to produce biofuels.

However, in order to produce biofuels from lignocellulosic biomass, the biomass is generally deconstructed into its primary components. This biomass deconstruction step can lead to resultant biofuels being substantially contaminated with metals, which are typically cumbersome and expensive to remove, thereby potentially limiting the end-product use of such biofuels.

SUMMARY OF THE INVENTION

The present disclosure relates to systems and methods pertaining to biomass pyrolysis and, more particularly, systems and methods pertaining to biomass pyrolysis for the removal of metals from biofuels.

In one or more aspects, the present disclosure provides a method of pyrolysing a biomass to form biochar, activating the biochar to form activated carbon, and contacting the activated carbon with a fluid produced from a biorefinery. The fluid may be one or more of biofuel, a biogas, or wastewater. After contacting the activated carbon with the fluid, the activated carbon is returned to soil.

In one or more aspects, the present disclosure provides a system including a biorefinery having integrated equipment to produce a fluid of one or more of a biofuel, a biogas, or wastewater. The biorefinery is configured to perform a method of pyrolysing a biomass to form biochar, activating the biochar to form activated carbon, and contacting the activated carbon with a fluid produced from a biorefinery. The fluid may be one or more of biofuel, a biogas, or wastewater. After contacting the activated carbon with the fluid, the activated carbon is returned to soil.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION OF THE INVENTION

Figure 1:
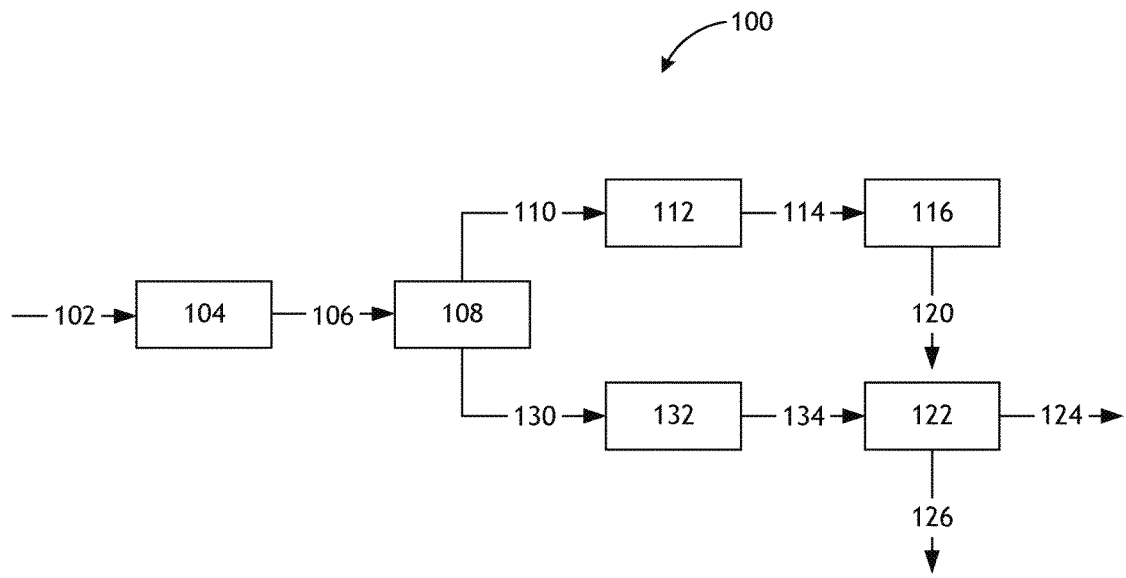
FIG. 1 is a schematic flowchart demonstrating one or more aspects of a biomass pyrolysis system of the present disclosure.

The present disclosure relates to systems and methods pertaining to biomass pyrolysis and, more particularly, systems and methods pertaining to biomass pyrolysis for the removal of metals from biofuels.

Global demands are motivating the need for the development of sustainable energy, such as biofuels, which can decrease greenhouse gas emissions, decrease reliance on fossil fuels, and not compete with food sources. These demands are heightened by increasing environmental regulations for the decarbonization of energy. Lignocellulosic material and other non-food or non-human food material derived from organic biomass (e.g., "lignocellulosic biomass" or "algal biomass") can be used to satisfy these demands.

Bioconversion of lignocellulosic biomass typically requires that the biomass be initially deconstructed into its main components of primarily hemicellulose, cellulose, and lignin. Thereafter, the deconstructed biomass may be hydrolyzed (e.g., enzymatically hydrolyzed) to release sugars therefrom (the "hydrolysate"). The released sugars in the hydrolysate may then be concentrated and converted to products, like biofuels, through bio-fermentation.

During the initial deconstruction process, various metals may become liberated from the biomass, such as sodium, potassium, calcium, and other trace metals. The presence of these metals can limit the use of resultant biofuels produced therefrom or otherwise interfere with downstream processing of the biomass, including downstream hydrotreatment.

The present disclosure provides integrated systems and methods employing a biomass pyrolysis step and using a native or modified byproduct therefrom, referred to as biochar, to capture metals from produced biofuels and allow for their sustainable return to soil.

More particularly, the systems and methods described herein utilize biomass byproduct (e.g., lignin byproduct) to produce activated carbon in a two-step process: first, the pyrolysis of lignin to generate biochar, a carbonaceous material, followed by, second, activation of the biochar to generate the activated carbon for use as a metal absorption media for treating biofuel (e.g., carbon metal trap synthesis). The adsorption media comprising the removed metals may be thereafter returned to the soil as a supplement for plant growth. For example, if biomass is being grown for the purpose of biofuel synthesis, the methods and systems described herein close the loop on trace nutrients by returning these metals back to the soil, improving the sustainability of large scale biofuels production. Indeed, the systems and methods of claim present disclosure capture at least about 90% by weight of metals contained within a biofuel, including up to 100% by weight of metals contained within a biofuel, encompassing any value and subset therebetween.

While the systems and methods of the present disclosure are primarily described with reference to lignocellulosic biomass material, it is to be understood that the systems and methods are equally applicable to other non-food or non-human food biomass materials, including algal biomass, without departing from the scope of the present disclosure.

One or more illustrative incarnations incorporating one or more elements are presented herein. Not all features of a physical implementation are described or shown in this application for the sake of clarity. It is understood that in the development of a physical embodiment incorporating one or more elements of the present disclosure, numerous implementation-specific decisions must be made to achieve the developer's goals, such as compliance with system-related, business-related, government-related and other constraints, which vary by implementation and from time to time. While a developer's efforts might be time consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present disclosure. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

Various terms as used herein are defined hereinbelow. To the extent a term used in a claim is not defined below, it should be given the broadest definition persons in the pertinent art have given that term as reflected in one or more printed publications or issued patents.

As used herein, the terms "lignocellulosic material," "lignocellulosic biomass," and "lignocellulose," and grammatical variants thereof, are used herein interchangeably and are broad terms encompassing a complex of namely hemicellulose, cellulose, and lignin present in the cell walls of woody plants. Lignocellulosic material may be derived from various sources including, but not limited to, agricultural residues and waste (e.g., corn stover, wheat straw, bagasse), forest residues (e.g., woodchips), energy crops (e.g., switch grass, wheatgrass, bamboo), and the like, and any combination thereof.

As used herein, the term "biomass," and grammatical variants thereof, refers to biological, organic matter that can be converted to fuel. The biomass for use in the various aspects of the present disclosure comprising lignocellulosic material refers to organic plant matter. Other biomass includes algae cells.

As used herein, the term "biofuel," and grammatical variants thereof, refers to a fuel derived directly or indirectly from biological, organic matter, used as an energy source (e.g., to produce heat or power).

As used herein, the term "biorefinery," and grammatical variants thereof (e.g., "biorefining"), refers to a facility that integrates biomass conversion processes and equipment to produce biofuels from biomass. The equipment for use in the biorefinery systems of the present disclosure includes any suitable equipment for performing the methods described herein. Such equipment includes, but is not limited to, mechanical size-reduction equipment (e.g., grinders, millers, and the like), transport conduits (e.g., hoses, pipes, conveyers, and other fluid conduits), separation equipment (e.g., decanters, centrifuges, distillation columns, molecular sieves, and the like), non-reactor tanks, seed train tanks, bioreactors, water filtration equipment, filtration equipment (e.g., belt filters, vacuum belt filters, filter presses, and the like), concentration equipment (e.g., evaporators, vapor-compression evaporation equipment, molecular sieves, and the like), steam generators, heat exchangers, pumps, compressors, boilers, water purification systems (e.g., reverse osmosis, filtration, deionizers, aerobic and anaerobic digesters, and the like), storage tanks, and the like, and any other equipment suitable for use in performing the methods described herein, and any combination thereof.

Referring to FIG. 1, illustrated is a schematic flowchart demonstrating one or more aspects of the biomass pyrolysis system 100 of the present disclosure. As shown, in one or more aspects, biomass comprising lignocellulosic material 102 is deconstructed in the deconstruction step 104 of the system 100, known as the pretreatment step. It is to be appreciated that although deconstruction step 104 is shown in FIG. 1, deconstruction of the lignocellulosic biomass is not necessary and may optionally be omitted, without departing from the scope of the present disclosure. That is, non-deconstructed biomass (raw lignocellulosic material, such as agricultural residue, and the like) may be used in accordance with the methods and systems of the present disclosure.

In the deconstruction step 104, the biomass is deconstructed into its main constituent parts—hemicellulose, cellulose, and lignin—using one or more pretreatment methods. Such pretreatment methods may include, but are not limited to, physical, physio-chemical, chemical, or biological methods. Examples include, but are not limited to, mechanical pretreatment (e.g., grinding, milling, and the like), hot water or steam (explosion) pretreatment, ammonia fiber expansion (AFEX) pretreatment, acid or alkaline pretreatment (e.g., sulfuric acid, sodium hydroxide, and the like), oxidizing agent pretreatment (e.g., hydrogen peroxide, employing ozonolysis, and the like), sulfite pulping, fungal pretreatment, enzymatic pretreatment, solvent-assisted extraction, and the like, and any combination thereof.

During deconstruction, cellulose and hemicellulose may release various monosaccharide sugars, such as pentose and hexose. Pentose encompasses any monosaccharide comprising five atoms of carbon, such as xylose, rhamnose, arabinose, and the like. Hexose encompasses any monosaccharide comprising six atoms of carbon, such as glucose, galactose, mannose, and the like. The relative amounts of pentose and hexose sugars released during the deconstruction step 104 depends on the source of lignocellulosic biomass and the employed pretreatment technology(s).

Optionally (not shown), the deconstructed material obtained during the deconstruction step 104 may be hydrolyzed to further release sugars from the cellulose and hemicellulose. Hydrolysis may be performed, for example, using enzymatic hydrolysis, such as by use of cellulose enzyme, typically in a hydrolysis reactor. The enzymatic hydrolysis portion converts at least the cellulose to hexose monosaccharides, such as glucose, and may yield additional pentose monosaccharides (e.g., in addition to those obtained from the deconstruction of the hemicellulose). In some instances, prior to hydrolysis, the deconstructed lignocellulosic biomass 100 may be dried or otherwise dewatered to reduce water content.

Regardless of whether hydrolysis is performed, the deconstructed material stream 106 remaining from the deconstruction step 104 comprises primarily water, a mixture of monosaccharides (e.g., pentose and hexose), lignin, and other compounds. Lignin is generally considered a low-value byproduct and cannot be used in the manufacture of biofuels, but is instead typically recycled for use, for example, in the pulp and paper industry. Accordingly, to prepare the stream 106 for biofuel production, the lignin must be removed therefrom, as represented by separation step 108 shown in FIG. 1.

Lignin may be separated from the deconstructed material stream 106 by any suitable means including, but not limited to, lignin depolymerization, lignin filtration, and the like, and any combination thereof. In some aspects, the lignin in the aqueous deconstructed material stream 106 may be removed by any type of filtration (e.g., belt or vacuum belt filtration). Two resultant streams are therefore obtained after the lignin separation step 108, a lignin-free or substantially free (i.e., mostly but not necessarily wholly) stream 130 and lignin-rich stream 110. As used herein, the term "lignin-free stream," and grammatical variants thereof, refers to a liquid stream comprising a reduction in lignin by weight of at least about 75% by weight compared to the aqueous deconstructed material stream, including a reduction of about 100% by weight compared to the aqueous deconstructed material stream, encompassing any value and subset therebetween. As used herein, the term "lignin-rich stream," and grammatical variants thereof, refers to a liquid stream comprising water, lignin, decomposed lignin, and other insoluble solids that were not removed from the deconstructed material stream 106. The lignin-rich stream comprises a lignin content relative to a balance of ash, other organic materials (e.g., sugar comprising molecules and/or monosaccharide sugars), or other biomass solids that is higher than that of the original incoming biomass, as well as the deconstructed material stream 106.

The lignin-free stream 130 is processed in bioconversion step 132 to convert the monosaccharides therein into biofuel 134. Any suitable bioconversion technique may be used in accordance with the systems and methods of the present disclosure, including bioconversion using one or more pyrolysis techniques, aerobic or anaerobic techniques (e.g., using non-genetically modified or genetically modified bacteria, and the like. In one or more aspects, prior to bioconversion, the lignin-free stream 130 may be concentrated in a sugar concentration step to facilitate production of the biofuel 134, such as to reduce equipment size requirements (e.g., smaller bioreactors, and the like) and aid in processing. Accordingly, when used, the sugar concentration step is performed in order to enhance the sugar concentration in the range of about 30% to about 60% by weight of the lignin-free stream 130, encompassing any value and subset therebetween. Sugar concentration may be achieved by any suitable methods including, but not limited to, vapor-compression evaporation (e.g., mechanical vapor compression or thermocompression), membrane filtration (e.g., ultrafiltration membranes), reverse osmosis, and the like, and any combination thereof. Other processing steps may also be employed to facilitate bioconversion, without departing from the scope of the present disclosure.

At least a portion of the lignin-rich stream 110 is used in accordance with the present disclosure to produce activated carbon for use as an adsorbent for removal of metals within biofuel 134. The particular amount of lignin required to produce the activated carbon may depend on a number of factors including, but not limited to, the concentration and type of metals present in the biofuel 134, and the like. Accordingly, in some instances the entirety of the lignin-rich stream 110 may be diverted to produce the activated carbon, and in other instances a portion may be diverted to a boiler/steam generator to produce power and/or heat, without departing from the scope of the present disclosure.

As shown, at least a portion of the lignin-rich stream 110 is treated in the lignin pyrolysis step 112 to produce carbonized lignin, such as within a pyrolysis reactor. The lignin-rich stream 110 supplies the lignin for carbonization and a gas (e.g., nitrogen) may be used (not shown) to displace air and provide an inert atmosphere for the pyrolysis reaction. The heat for the pyrolysis reaction may be provided by a boiler/steam generator located within the biorefinery. The pyrolysis reaction generates a carbonaceous material (biochar) stream 114. A gaseous pyrolysis effluent (not shown) is also produced and composed of water, light organic gases, and hetero-elements, which may be returned to the boiler/steam generator to assist in energy production for the bioconversion process or other processes within the biorefinery, or otherwise vented.

Depending on the moisture content of the lignin-rich stream 110, the lignin-rich stream 110 may require drying or otherwise dewatering (not shown) prior to performing the pyrolysis reaction to reduce the water generated during the pyrolysis step 112. Drying may be performed by any suitable methods including, but not limited to, ambient air drying, thermal drying, solar drying, mechanical dewatering (e.g., filter press, such as plate and frame and belt filter), centrifuging, and the like, and any combination thereof.

The biochar in the biochar stream 114 is activated in the activation step 116 of the system 100. Activation may be performed by any suitable means including, for example, physical activation and/or chemical activation. The particular methodology for activation is not considered to be particularly limiting. In one or more aspects, activation may be achieved by exposure to an oxidant (e.g., carbon dioxide, oxygen gas, a peroxide, and the like). In various aspects, activation may be performed by treating the biochar stream 114 to create metal ion-capturing functional groups, such as oxidation to carboxylic acids. In some instances, the pyrolysis step 112 and/or the activation step 116 may be fine-tuned (e.g., run at lower temperatures or shorter residence times for the pyrolysis reaction) to retain or otherwise maximize potentially relevant functional groups for sequestering metals.

The final activated carbon 120 is formed after activation is complete. The method of determining whether activation is complete is not considered particularly limiting. An example of a suitable method for determining whether activation is complete includes, but is not limited to, nitrogen sorption measurement which provides surface area per volume. Higher activation correlates to higher surface area. The activated carbon 120 is combined with biofuel 134 in the metals removal step 122 of the system 100 of the present disclosure. The activated carbon 120 may be contacted with the biofuel 134, for example, as a metal adsorptive bed (i.e., an adsorptive or capture bed for capturing metals). For example, an adsorption column may be used to facilitate removal of the metals from the biofuel 134. For example, the activated carbon 120 may be first fed to the adsorption column and, thereafter, the biofuel 134 is fed to the adsorption column. The adsorption column may operate either with co-current downward flow or counter-current flow with the flowing biofuel 134. In various instances, adsorption column may be a moving bed adsorption column, for example, in which the activated carbon 120 is charged to a hopper vessel which then feeds the moving bed adsorption column. The rate of the solid flow of the activated carbon 120 through the moving bed adsorption column may be set to the rate of the activated carbon 120 exhaustion.

Thereafter, the activated carbon-treated biofuel 124 may be separated from the metal-containing activated carbon 126. The active carbon-treated biofuel 124 may be barreled and prepared for consumer or commercial distribution or otherwise further processed, such as part of an integrated hydrotreating system. The active carbon-treated biofuel 124 may advantageously exhibit reduced polarity compared to untreated biofuel 134 to enhance metal sequestration. Further, unlike more expensive metal removal schemes, such as ion exchange, the metal-containing activated carbon 126 produced in accordance with various aspects of the present disclosure may be used as a soil additive or otherwise returned to the land for soil use, thereby returning metals (and carbon) thereto.

While FIG. 1 shows a parallel lignin pyrolysis and biofuel production system, it is to be understood that the systems and methods described herein encompass uncoupled lignin pyrolysis and biofuel production, without departing from the scope of the present disclosure. That is, the activated carbon described herein may be produced using a separate system for performing biomass pyrolysis and thereafter used to treat newly produced biofuel or biofuel that has previously been barreled or is otherwise in storage. Moreover, as provided above, the biomass pyrolysis systems and methods of the present disclosure to produce activated carbon are not limited to lignocellulosic biomass (or solely lignin). For example, the activated carbon may be produced in accordance with the various aspects described herein using biomass pyrolysis of all or any portion of lignocellulosic biomass (i.e., any of lignin, cellulose, hemicellulose, alone or in any combination), algal biomass, and the like, and any combination thereof.

For example, in the context of an algal biomass biorefinery for the production of algae-based biofuel, algae cells may also be grown to help clean wastewater produced within the biorefinery. However, the cleaned wastewater cannot be used in processes to produce non-human food byproducts (e.g., animal feed) due to the presence of the wastewater contaminants, including metals, such as heavy metals. The systems and methods of the present disclosure may be utilized to pyrolyse algal biomass, such as biomass not otherwise used to produce biofuel or remaining remnants of algae cells after they have been lysed and lipids removed therefrom, and thereafter produce activated carbon that can be contacted with the wastewater (e.g., using an adsorption bed), as described hereinabove, for removing these metal contaminants. While other purification steps may additionally be necessary, treatment with the activated carbon according to the present disclosure may permit cost and time reduction and, further, the used metal-containing activated carbon can be returned to the soil, as described hereinabove. The process as described herein for performing the pyrolysis with lignin and subsequent activation of the produced biochar is, accordingly, equally applicable to algal biomass (and other biomasses) for use in metal removal.

In various aspects of the present disclosure, the activated carbon described herein may additionally be used to remove sulfur, such as in the form of hydrogen sulfide ($H_2S$) or sulfur oxides ($SO_x$, such as $SO_2$, $SO_3$, $SO_4$). As defined herein, the term "sulfur oxides," and grammatical variants thereof, encompasses any compound defined by $SO_x$, including oxidized versions thereof (e.g., sulfates). While various aspects of the present disclosure are described with reference to $H_2S$, it is to be appreciated that such aspects are equally applicable to other sulfates, without departing from the scope of the present disclosure.

For example, the activated carbon described herein may be used to remove $H_2S$ prior to burning or venting gaseous pyrolysis effluent, which may allow elimination of one or more equipment in a biorefinery, such as a wet gas scrubber. For example, the activated carbon may be functionalized or subject to a surface preparation strategy that is optimized for the adsorption of $H_2S$. Wet gas scrubbers may add substantial production costs and complexity to a biorefinery. Moreover, gaseous pyrolysis effluent may be recycled for use in activating the produced biochar to form the activated carbon (rather solely combusted) and capture $H_2S$, thereby allowing more economical conversion of the gaseous pyrolysis effluent to hydrogen. For example, traditional $H_2S$ removal systems include amine capture systems, which are large, complex and require significant energy input for operation (e.g., high heat and pressure requirements).

Figure 2:
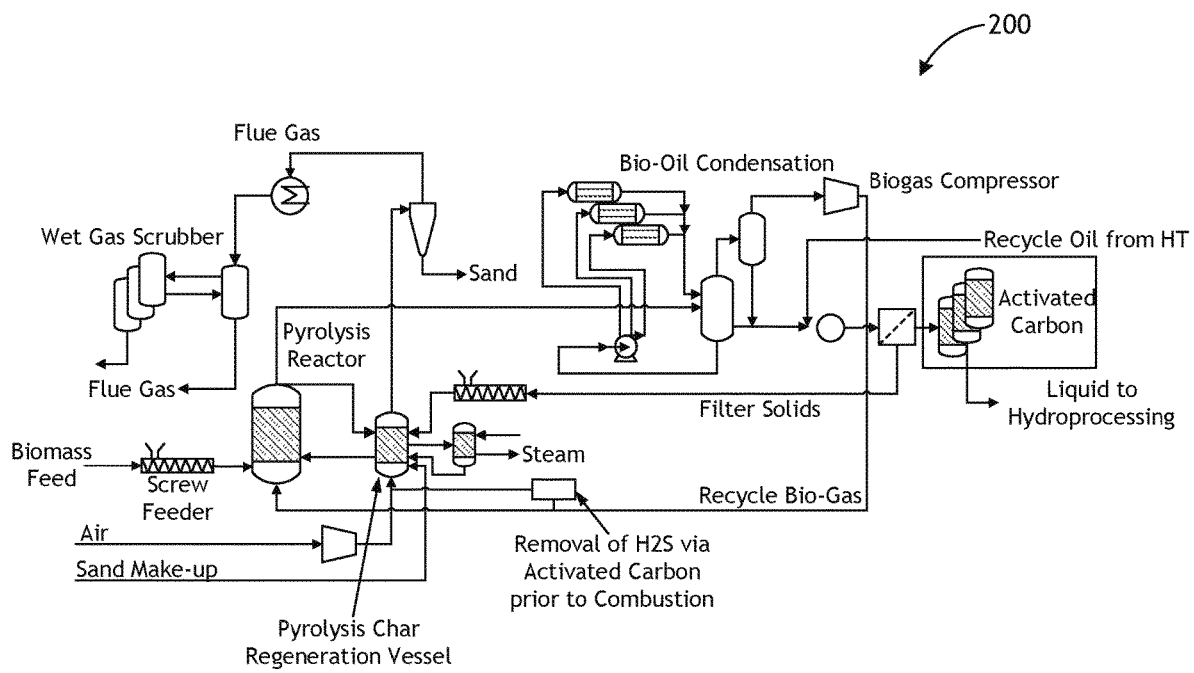
FIG. 2 is a schematic flowchart demonstrating one or more aspects of a biomass pyrolysis system of the present disclosure.

Referring now to FIG. 2, illustrated is a schematic flowchart demonstrating one or more aspects of a biomass pyrolysis system 200 that can incorporate the use of activated carbon for metals removal from a biofuel and $H_2S$ removal from pyrolysis, as shown in the boxed areas. As shown in FIG. 2, various equipment within a biorefinery may be used to perform the systems and methods described herein, including processing for the production of biofuel (as shown, by use of pyrolysis). FIG. 2 shows such equipment using standard P&I symbols, as understood by one of skill in the industry.

As shown in FIG. 2, a biomass (e.g., a lignocellulosic biomass or other biomass type) may be fed to a pyrolysis reactor, such as by use of a screw feeder for the production of biofuel in a biorefinery. Biomass constituents for the production of biofuel (e.g., monosaccharides and sugars) 206 may be flowed from the pyrolysis reactor to be processed in the biofuel processing portion of the system 200 for the production of biofuel 208 and biogas. All or a portion of the remaining pyrolysed constituents that are not useful for the production of biofuel (i.e., biochar, as described above) 202 may be activated to form activated carbon. Activation may be performed in the pyrolysis reactor itself or in a secondary biochar activation vessel (not shown). One or more purge vessels (one shown) may be used to burn char from the sand and/or burn char, for example, to generate heat for one or more aspects of the biomass pyrolysis system 200. In some instances, a resultant regenerated stream 204 (e.g., of sand and/or burned biochar) may be produced from the regeneration process, and pass from the regeneration vessel through a vessel for cooling/steam generation (e.g., the vessel shown to the right of the regeneration vessel) and recycled back for use in the regeneration vessel or the pyrolysis reactor to facilitate either regeneration of sand and/or burned char or pyrolysis of biomass into biochar and/or activation thereof. Flue gas from the regeneration vessel may be conveyed for wet gas scrubbing (e.g., cleaning for venting), or otherwise reused in various other processes of the biorefinery. In one or more aspects, sand or other solid particulates may be filtered from the flue gas and used in one or more processes within the biorefinery (e.g., sand make-up to the pyrolysis biochar activation vessel).

With continued reference to FIG. 2, biomass constituents for the production of biofuel (e.g., monosaccharides and sugars) 206 may be flowed from the pyrolysis reactor to be processed in the biofuel processing portion of the system 200 for the production of biofuel 208 and biogas. The biofuel 208 may be filtered using a separator or other filtration device to remove any solids therefrom. These filtered solids may be recycled back to the regeneration vessel for use therein (thus minimizing the amount of sand make-up needed for pyrolysis). The biofuel 208, whether filtered or not (e.g., filtration is optional), may then be contacted with activated carbon as shown as a blocked portion of the system 200 (e.g., showing where activated carbon could be used in a biorefinery to treat biofuel). The treated biofuel 208 may then optionally be further treated by downstream hydrotreatment processing, in some instances. Notably, biofuel from downstream hydrotreatment ("HT") processing may also be used to supplement biofuel 208 prior to contacting the biofuel 208 with the activated carbon (e.g., to reduce viscosity for facilitating downstream processing).

Biogas produced as part of the biofuel processing portion of the system 200 may be recycled back (and may also be conveyed through a compressor, as shown) to the pyrolysis reactor and/or the pyrolysis biochar activation vessel. Prior to introducing the recycled biogas to the pyrolysis reactor and/or the pyrolysis biochar activation vessel, it may be treated with activated carbon (e.g., a different stream of activated carbon) to remove $H_2S$ therefrom as shown as another blocked portion of the system 200 (e.g., showing where activated carbon could be used in a biorefinery). As stated above, this could replace the use of an additional wet gas scrubber. Accordingly, as shown in FIG. 2, the activated carbon produced in accordance with one or more aspects of the present disclosure may be utilized in multiple portions of a biorefinery to remove metals and/or to remove sulfur (e.g., $H_2S$).

The present disclosure provides, among others, the following aspects, each of which may be considered as optionally including any alternate thereof.

Clause 1: A method comprising: pyrolysing a biomass, thereby forming biochar;
activating the biochar, thereby forming activated carbon; contacting the activated carbon with a fluid produced from a biorefinery, the fluid consisting of one or more of a biofuel, a biogas, and wastewater; and after the contacting, returning the activated carbon to soil.

Clause 2: The method of Clause 1, further comprising sequestering a metal from the fluid produced from the biorefinery and contacted with the activated carbon.

Clause 3: The method of Clause 1 or 2, further comprising sequestering sulfur from the fluid produced from the biorefinery and contacted with the activated carbon.

Clause 4: The method of Clause 3, wherein the sulfur is in the form of hydrogen sulfide or a sulfur oxide.

Clause 5: The method of any of the preceding Clauses, wherein activating the biochar comprises contacting the biochar with an oxidant.

Clause 6: The method of any of the preceding Clauses, wherein the fluid produced from the biorefinery is biofuel.

Clause 7: The method of any of Clause 1 to Clause 5, wherein the fluid produced from the biorefinery is biogas.

Clause 8: The method of any of Clause 1 to Clause 5, wherein the fluid produced from the biorefinery is wastewater.

Clause 9: The method of any of the preceding Clauses, wherein the biomass is a lignocellulosic biomass.

Clause 10: The method of any of Clause 1 to Clause 8, wherein the biomass is an algal biomass.

Clause 11: A system comprising: a biorefinery that comprises integrated equipment to produce a fluid consisting of one or more of a biofuel, a biogas, and wastewater, the biorefinery configured to perform a method of: pyrolysing a biomass, thereby forming biochar; activating the biochar, thereby forming activated carbon; contacting the activated carbon with the fluid produced from a biorefinery; and after the contacting, returning the activated carbon to soil.

Clause 12: The system of Clause 11, further comprising sequestering a metal from the fluid produced from the biorefinery and contacted with the activated carbon.

Clause 13: The system of Clause 11 or Clause 12, further comprising sequestering sulfur from the fluid produced from the biorefinery and contacted with the activated carbon.

Clause 14: The system of Clause 13, wherein the sulfur is in the form of hydrogen sulfide or a sulfur oxide.

Clause 15: The system of any of Clause 11 to Clause 14, wherein activating the biochar comprises contacting the biochar with an oxidant.

Clause 16: The system of any of Clause 11 to Clause 15, wherein the fluid produced from the biorefinery is biofuel.

Clause 17: The system of any of Clause 11 to Clause 15, wherein the fluid produced from the biorefinery is biogas.

Clause 18: The system of any of Clause 11 to Clause 15, wherein the fluid produced from the biorefinery is wastewater.

Clause 19: The system of any of Clause 11 to Clause 18, wherein the biomass is a lignocellulosic biomass.

Clause 20: The system of any of Clause 11 to Clause 18, wherein the biomass is an algal biomass.

Therefore, the aspects of the methods and systems presented herein are well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The aspects illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
deconstructing a lignocellulosic biomass into hemicellulose, cellulose, and lignin, thereby forming an aqueous deconstructed material stream;
separating the lignin from the aqueous deconstructed material stream, thereby forming a lignin-rich stream and a lignin-free stream, wherein the lignin-free stream comprises a reduction in the lignin by weight of at least about 75% by weight of the aqueous deconstructed material stream;
pyrolysing the lignin-rich stream, thereby forming biochar;
activating the biochar, thereby forming activated carbon;
separating the activated carbon into a first portion and a second portion;
performing surface preparation on the activated carbon of the second portion after the separating of the activated carbon to optimize the second portion for $H_2S$ removal;
contacting the first portion of the activated carbon with a biofuel produced from the lignin-free stream in a biorefinery;
contacting the second portion of the activated carbon with a recycled biogas produced from the lignin-free stream in the biorefinery to produce $H_2S$ reduced recycled biogas; and
after the contacting of the first portion, returning the first portion of the activated carbon to soil.

2. The method of claim 1, further comprising sequestering a metal from the biofuel produced from the biorefinery and contacted with the activated carbon.

3. The method of claim 1, further comprising sequestering sulfur from the biofuel produced from the biorefinery and contacted with the activated carbon.

4. The method of claim 3, wherein the sulfur is in the form of hydrogen sulfide or a sulfur oxide.

5. The method of claim 1, wherein activating the biochar comprises contacting the biochar with an oxidant.

6. The method of claim 1, further comprising:
hydrotreating the biofuel after contacting with the activated carbon to form a hydrotreated biofuel; and
recycling a portion of the hydrotreated biofuel into the biofuel before contacting with the activated carbon.

7. The method of claim 1, further comprising introducing the $H_2S$ reduced recycled biogas into a pyrolysis unit where the pyrolysing of the lignin-rich stream occurs.

8. The method of claim 1, further comprising returning a light organic gas formed when pyrolysing the lignin-rich stream to a steam generator that produces heat for the pyrolysing.

* * * * *